United States Patent Office 3,371,014
Patented Feb. 27, 1968

3,371,014
METHOD OF COMBATING ANGINA PECTORIS AND A PHARMACEUTICAL PREPARATION SUITABLE FOR THIS PURPOSE
Sven Carlsson, Stockholm, Sweden, assignor to AB Recip, Stockholm, Sweden, a corporation of Sweden
No Drawing. Continuation-in-part of application Ser. No. 150,094, Nov. 3, 1961. This application Mar. 5, 1965, Ser. No. 437,545
Claims priority, application Great Britain, Nov. 8, 1960, 38,324/60
2 Claims. (Cl. 167—65)

ABSTRACT OF THE DISCLOSURE

The invention discloses a new pharmaceutical composition for combating angina pectoris. The composition contains in dosage unit form 10 mg. of a neutral acid addition salt of 4,4-diphenyl-2-tert. butylamino butane. The acid component of the salt is hydrochloric acid, hydrobromic acid or sulphuric acid. The composition also contains a pharmaceutically acceptable diluent or carrier. The drug is administered to a human host, preferably per os.

CROSS REFERENCE TO PRIOR APPLICATIONS

This is a continuation-in-part of application Ser. No. 150,094, filed Nov. 3, 1961, now abandoned.

The present invention relates to the combating of angina pectoris in humans and to the dilating of the coronary vessels desired in case of angina pectoris attacks and furthermore to a drug useful in combating angina pectoris and having a dilating effect on the coronary vessels.

There are already many suggestions for the combating of angina pectoris and for the counteracting to angina pectoris attacks by dilating the coronary vessels but the effect of the drugs used until now for this purpose is not sufficiently lasting.

According to the invention angina pectoris is combated and the coronary vessels are dilated with the aid of a neutral acid addition salt of 4,4-diphenyl-2-tert. butylamino butane the acid component of which is selected from the group consisting of hydrochloric acid, hydrobromic acid and sulphuric acid. The salts of 4,4-diphenyl-2-tert.butylamino butane the formula of which base is

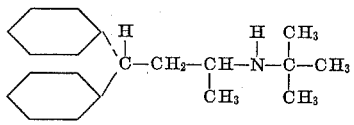

with the mentioned acids are non-toxic and crystallized. The last named fact is valuable since undesired by-products can be eliminated by the crystallisation and the checking of the melting points of the crystallized salts facilitates a control of the purity.

The new drug has, as already pointed out, a pronounced dilating effect on the coronary vessels but furthermore a lesser spasmolytic effect than other drugs having a similar dilating effect on the coronary vessels as the new drug. Said fact has to be regarded as advantageous since drugs with pronounced spasmolytic effect cause thirst which is very often disturbing for the patients.

The new drug is administered per os and the dilating effect on the coronary vessel is observed already after a few minutes and said effect lasts about one hour or longer whereas the coronar dilating effect of e.g. glyceryltrinitrate (nitroglycerin) has a short duration. The dosage unit of the active component, i.e. of the neutral hydrochloride, hydrobromide or sulfate of the 4,4-diphenyl-2-tert.butylamino butane used for combating attacks of angina pectoris is about 10 mg. and no disturbing effect has been observed even if this dosage is administered repeatedly after the effect of the first or preceding dosage has disappeared.

The pharmaceutical preparations used according to the invention for combating angina pectoris contain in addition to the dosage unit of about 10 mg. of the active component the ingredients and diluents usual for the manufacture of tablets, pills, etc.

The base contained in the neutral hydrochloride, bromide or sulfate forming the active component of the pharmaceutical preparation used according to the invention for combating angina pectoris is manufactured in using β,β-diphenylethylmethyl ketone as starting material. By reacting this starting material with tert.butylamine under reductive conditions the 4,4-diphenyl-2-tert. butylamino butane is formed. A suitable reductive agent is e.g. anhydrous formic acid.

An advantageous process for the manufacture of the new compound is illustrated by the following example.

73 g. tert.butylamine and 50 ml. anhydrous formic acid are added to 224 g. β,β-diphenylethylmethyl ketone. The mixture is heated to 165° C. and the progressing reaction causes the development of carbon dioxide formed by the oxidation of the formic acid which oxidation takes place simultaneously with the reduction of the ketone or its condensation product with the amine.

During eight hours the reaction temperature is slowly increased to 225° C. A weak acid reaction is maintained by dropwise addition of anhydrous formic acid. After the temperature of the reaction mixture has dropped to room temperature the reactiton product is extracted by cooking the reaction mixture with one litre of 1 N HCl. The aqueous solution is then alkalized with sodium hydroxide and four times extracted with 250 ml. ether each time. The ether is removed by evaporation and concentrated hydrochloric acid is added to the residue. The hydrochloride of 4,4-diphenyl-2-tert.butylamino butane is thus obtained in form of a slurry of the crystals of the said substance. The crystals are filtered off and washed with ether containing 10% ethanol. The crystals are dried and recrystallized from water; 165 ml. water are used for the recrystallisation of 100 g. of the crystals.

4,4-diphenyl-2-tert.butylamino butane hydrochloride is a white crystalline substance soluble to somewhat more than 10% in water of room temperature, easily soluble in ethanol and only in a small extent soluble in ether.

The melting point of the hydrochloride is 178–180° C.

In the same way addition salts with other non-toxic acids may be formed. The hydrobromide forms white crystals and has a melting point of 198–201° C. It is rather difficultly soluble in water.

The acid addition salt with sulphuric acid containing 2 moles of the base per mole of the sulphuric acid forms white crystals and has a melting point of 245–250° C. It is difficultly soluble in water.

What I claim is:

1. A method of combating angina pectoris which consists in orally administering to a human host a composition containing a dosage unit of about 10 mg. of a neutral acid addition salt of 4,4-diphenyl-2-tert.butylamino butane the acid component of which is selected from the group consisting of hydrochloric acid, hydrobromic acid and sulphuric acid.

2. A pharmaceutical composition for combating angina pectoris containing in a dosage unit of about 10 mg. as active component causing a dilating effect on the coronary vessels a neutral acid addition salt of 4,4-diphenyl-2-tert.butylamino butane the acid component of which is selected from the group consisting of hydrochloric acid, hydrobromic acid and sulphuric acid, and the ingredients and diluents usual for the manufacture of tablets and pills.

References Cited

Allen et al., Proceedings of the Staff Meetings of the Mayo Clinic, volume 29, No. 17, page 460, 1954.

ALBERT T. MEYERS, *Primary Examiner.*

SAM ROSEN, JULIAN S. LEVITT, *Examiners.*

L. RANDALL, *Assistant Examiner.*